(12) United States Patent
Mackiewicz

(10) Patent No.: US 7,992,387 B1
(45) Date of Patent: Aug. 9, 2011

(54) ARRANGEMENT FOR SIMULTANEOUS ACTUATION OF COMPENSATION VALVES

(75) Inventor: John E. Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 532 days.

(21) Appl. No.: 12/192,364

(22) Filed: Aug. 15, 2008

(51) Int. Cl.
*F15B 7/08* (2006.01)
*B60T 11/20* (2006.01)

(52) U.S. Cl. .......................................... 60/589; 60/562

(58) Field of Classification Search ............... 60/562, 60/588, 589
See application file for complete search history.

(56) References Cited

U.S. PATENT DOCUMENTS

| | | | |
|---|---|---|---|
| 3,310,944 A | 3/1967 | Bauman | |
| 4,132,073 A * | 1/1979 | Ewald | 60/589 |
| 5,018,353 A | 5/1991 | Pugh | |
| 5,111,661 A | 5/1992 | Savidan et al. | |
| 5,207,062 A | 5/1993 | Wilson et al. | |
| 5,279,125 A | 1/1994 | Keyes et al. | |
| 5,943,863 A | 8/1999 | Jordan | |
| 6,012,288 A * | 1/2000 | Gualdoni et al. | 60/562 |
| 6,402,263 B1 * | 6/2002 | Wasson | 60/562 |
| 6,775,978 B1 | 8/2004 | Vehe | |

FOREIGN PATENT DOCUMENTS

DE 19900048 7/2000

OTHER PUBLICATIONS

International Search Report in corresponding PCT application (i.e., PCT/US2009/053410) mailed Oct. 21, 2009 (3 pages).

* cited by examiner

*Primary Examiner* — Michael Leslie
(74) *Attorney, Agent, or Firm* — Maginot, Moore & Beck

(57) ABSTRACT

A master cylinder having a housing with a bore wherein front and rear pistons are located by return springs to define front and rear chambers. The front and rear chambers are respectively connected by an axial port and a radial port in the housing to a reservoir. Communication of fluid between the bore and reservoir is controlled by a rear center compensation valve that is linked to a front center port compensation valve such that fluid communication between the front and rear chambers and reservoir is controlled by movement of the rear piston in response to an input force with a first and second actuation springs respectively closing the front and rear center port compensation valves to allow simultaneous pressurization of fluid in the front chamber and rear chamber that is supplied to front wheel brakes and rear wheel brakes to effect a brake application.

7 Claims, 2 Drawing Sheets ically closed to effect a brake application in according to
ARRANGEMENT FOR SIMULTANEOUS ACTUATION OF COMPENSATION VALVES This invention relates to an arrangement for actuating first and second center port valves located in a bore of a master cylinder to control the simultaneous termination of communication between the bore and a reservoir and thereby institute an immediate brake application.

BACKGROUND OF THE INVENTION

U.S. Pat. Nos. 5,018,353 and 5,111,661 disclose master cylinders wherein compensation between a first chamber in a bore of housing and a reservoir occurs through a single center port compensation valve associate with a first piston and between a second chamber in the bore through a relationship established between a radial port and sealing structure carried on a second piston. In order to eliminate the possibility of cutting a nub in a seal by extrusion into the radial port, U.S. Pat. Nos. 5,207,062, 5,279,125, 5,943,863 and 6,775,978 disclose the use of a second center port compensation valve through which compensation is achieved for the second operational chamber in a bore. Most such master cylinders have a separate compensation valve for the first and second pressurizing chambers in the bore through which communication typically occurs through ports when the first and second pistons are in a rest position. As the first and second pistons approach the rest position, a stop pin engages the compensation valve to open the compensation valve and initiate communication between the bore and reservoir. When a brake application is desired, an input force is applied to a first piston in the bore of the master cylinder and depending on the balance of forces of the return springs in the master cylinder one of the two compensation valves will close and allow pressure in the fluid in a corresponding chamber to increase and act to move a second piston and close the second compensation valve such that the pressure fluid in a second chamber increases. Unfortunately, the sequential movement in the actuation of the compensation valves causes a lag in the time an input is applied to the time a brake application actually occurs. In essence, an initial stroke on a brake pedal does not cause a displacement of fluid from a master cylinder to the wheel cylinders in a brake actuation. This delay is commonly referred as lost travel and is not a desirable pedal feel characteristic experienced by a driver and particularly during an emergency brake application.

SUMMARY OF THE INVENTION

A primary object of the present invention is to provide a brake system with a master cylinder having center port compensation valves that are simultaneously closed in response to an input force being applied to a first piston such that pressurized fluid is immediately under development for communication to wheel brakes to effect a brake application.

According to this invention, the master cylinder has housing with a bore that is connected through axial port in the bottom of the bore and through a radial port with a reservoir and to the brake system through first and second outlet ports. First and second pistons are positioned in the bore by a first return spring located between the first and second pistons to define a first chamber and by a second return spring located between the second piston and the bottom of the bore to define a second chamber. The first return spring is caged between a first retainer and a second retainer by a first shaft to define limits for the first chamber. A first poppet spring caged between the first retainer and a first cylindrical member for a first poppet of a first center port compensation valve attached to the first shaft through a first ball and socket arrangement urges the first poppet toward a first seat surrounding a passage connected to the radial port. The second return spring is caged between a third retainer and a fourth retainer by a second shaft that is slidably sealed in the second piston to define limits for the second chamber. A second poppet spring caged between the third retainer and a second cylindrical member for a second poppet of a second center port compensation valve. The second cylindrical member is linked by the second shaft that extends through the second piston to the first cylindrical member of the first center port valve by a second first ball and socket arrangement in the first cylindrical body. The length of the first shaft is adjustable and as a result the length between the first poppet and first seat and the second poppet and second seat is matched. When an input is applied to the first piston, the first and second pistons move in the bore and at the same time the first and second poppet springs move the first and second poppet into corresponding engagement with the first and second seats to seal the radial passage and axial bore from the reservoir and thus all further movement of the first and second pistons pressurizes fluid in the first and second chambers that is communicated to the wheel brakes to effect a brake application.

An advantage of this brake system is provided by linking the closure of a second poppet of a second compensation valve with the closure of a first poppet of a first compensation valve to simultaneously begin pressurizing fluid in first and second chambers as a function of movement of a first piston by an actuation force.

A further advantage of this invention is provided by caging a front return spring by a linking shaft arrangement that is connected to a retainer for a forward poppet for a front chamber and sealingly extends through a piston and is fixed to a rearward poppet for a rear chamber, the rearward poppet being connected to a retainer by an adjustable length shaft to set a closure distance for rear poppet and forward poppet such that the front chamber and rear chamber are simultaneously dis-connected from a reservoir and connected to wheel brakes to effect a brake application.

DETAILED DESCRIPTION OF THE INVENTION

Figure 1:
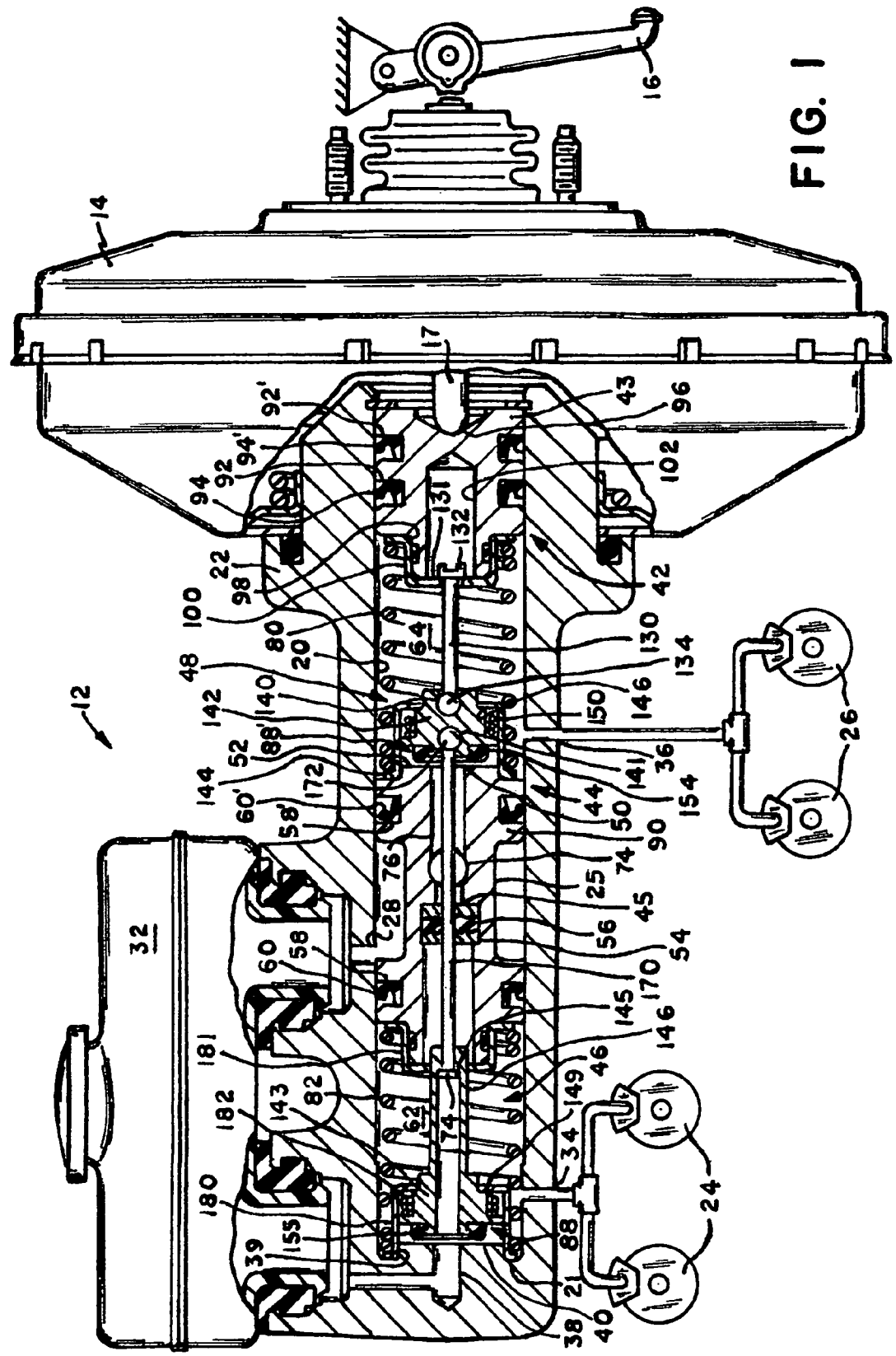
FIG. 1 is a sectional view of a master cylinder for a brake system having center port compensation valves wherein first and second center port compensation valves are simultaneously closed to effect a brake application in according to the present invention.

The master cylinder 12 illustrated in FIG. 1 is of a type disclosed in specific detail in U.S. Pat. No. 6,775,978 for providing a brake system with pressurized fluid to effect a brake application. The master cylinder 12 receives an actuation force from a brake booster 14 in response to an input force applied by an operator to a brake pedal 16. The actuation force is communicated through a push rod 17 to move first 42 and second 44 pistons located in a bore 20 of the housing 22 of the master cylinder 12 to pressurize fluid that is provided to front 24 and rear 26 wheel brakes to effect a brake application.

In more detail, the bore 20 of housing 22 is connected by an axial port 38 located in the bottom 21 of the bore 20 and by a radial port 28 to a reservoir 32, by a front outlet port 34 to the front wheel brakes 24 and by rear outlet port 36 to the rear wheel brakes 26. Housing 22 has a raised orifice 39 that surrounds axial port 38 with a face thereon that forms a seat 40 for a poppet 88 of a front center port compensation valve 46. The front center port compensation valve 46 controls communication between the reservoir 32 and a front chamber 62 while communication between the reservoir 32 and a rear chamber 64 is controlled by a rear center port compensation valve 48 by way of a groove 25, cross bore 74 and axial bore 76 in a cylindrical body or member 90 of the second piston 44.

The first piston 42 has a cylindrical body 43 with grooves 92,92' on its peripheral surface that carry lip seals 94,94' which engages bore 20 of housing 22 to seal the rear chamber 64 from the surrounding environment, an axial depression 96 for receiving a head on the output push rod 17 of vacuum brake booster 14, an annular shoulder 98 that forms a guide surface that extends from a front face that receives a rear retainer 100 for a return spring 80 and an axial bore 102 that extends along a center line from the front face toward the axial depression 96.

A first shaft 130 has a head 132 on a first end and a ball 134 on a second end. The ball 134 passes through an axial opening in rear retainer 100 and is received in a socket 140 in a cylindrical body or member 142 of the rear compensation valve 48. The cylindrical body 142 is located in a front retainer 144 that along with retainer 100 retains a return spring 80. When a force is applied to compress the return spring 80 and bring a shoulder 146 on cylindrical body 142 into engagement with retainer 144, an actuation spring 150 for the poppet is compressed. The ball 134 is held in socket 140 by crimping or rolling over the rear end of cylindrical body 142 to cage the return spring 80 between the retainers 100 and 144. A cap 154 is attached to the front end of the cylindrical body 142 to define a resilient face for the poppet 88' of the rear center port compensation valve 48. The caging of return spring 80 defines a desired length corresponding to a size limit for the rear chamber 64 when piston 42 is placed in bore 20 of housing 22.

The cylindrical body 90 of the second piston 44 is further defined in that axial bore 76 that extends from an opening 50 on a rear end thereof to an opening in the front end thereof with a shoulder 45 defined by an internal groove 54 that receives and retains a seal 56. The peripheral surface of cylindrical body 90 has grooves 58, 58' that respectively receive and retain seals 60, 60' to seal the front chamber 62 and the rear chamber 64 from cross-bore 74. The end of cylindrical body 90 has a flat surface that surrounds orifice 50 of bore 76 to provide a seat 52 for the cap 154 on the cylindrical body 142 of the poppet 88' of the rear center port compensation valve 48.

A shaft 170 that extends through axial bore 76 of cylindrical body 90 of the second piston 44 has a ball 172 on a first end and a head 174 on a second end. Shaft 170 engages seal 56 to prevent communication between the front chamber 62 and reservoir 32 to the cross bore 74 by way of by way of axial bore 76 in the cylindrical body or member 90 of the second piston 44.

The cylindrical body 142 of the rear compensation valve 48 is linked to a corresponding cylindrical body 143 of the front compensation valve 46 by head 174 on a front end of a shaft 170 that engages a shoulder 145 on an annular projection or sleeve 146 that extends from a cylindrical body 143 while a ball 172 on a rear end of shaft 170 is held in a socket 141 in cylindrical body 142 by crimping or rolling over the front end of cylindrical body 142. The cylindrical body 143 is held in a front retainer 180 for a front return spring 82 and has a shoulder 149. Front retainer 180 along with cylindrical body 143 engages and cages an actuation spring 182 between retainer 180 and retainer 181 when the ball 172 is held in socket 141. Axial projection 146 engages and is guided by a rear retainer 181 that is located on the front of cylindrical body 90 to assure that poppet 88 is maintained in radial alignment with seat 40 in housing 22. A cap 155 is attached to the front of the cylindrical body 143 to define a resilient face for the poppet 88 of the center port compensation valve 46.

The first 42 and second 44 pistons are positioned in bore 20 by return springs 80 and 82 as shown in FIG. 1 to define a limit for the front chamber 62 which is connected to outlet port 34 and the rear chamber 64 which is connected to outlet port 36. The length of the return springs 80 and 82 position the cylindrical body 90 of the second piston 44 such that the groove 25 is aligned with compensation port 28 in housing 22 and as a result cross bore 74 is always connected with reservoir 32.

MODE OF OPERATION

In the rest position illustrated in FIG. 1, fluid from reservoir 32 is freely communicated to the front chamber 62 by way of axial port 38 while fluid is communicated to the rear chamber 64 by way of radial port 28, compensation groove 25, cross bore 74 and axial passage bore 76 in cylindrical body 90 of the second piston 44. Fluid freely flows between reservoir 32 to the rear chamber 62 and front chamber 64 in bore 22 through holes in the tubular body of retainers 144,180. With radial port 28 located at approximately the mid-point of housing 22 and since communication of fluid from the reservoir 32 to the rear chamber 64 occurs through the second piston 44, the housing 22 of the master cylinder 12 could be inserted into a front chamber of a vacuum booster to create a compact unitary structure.

Figure 2:
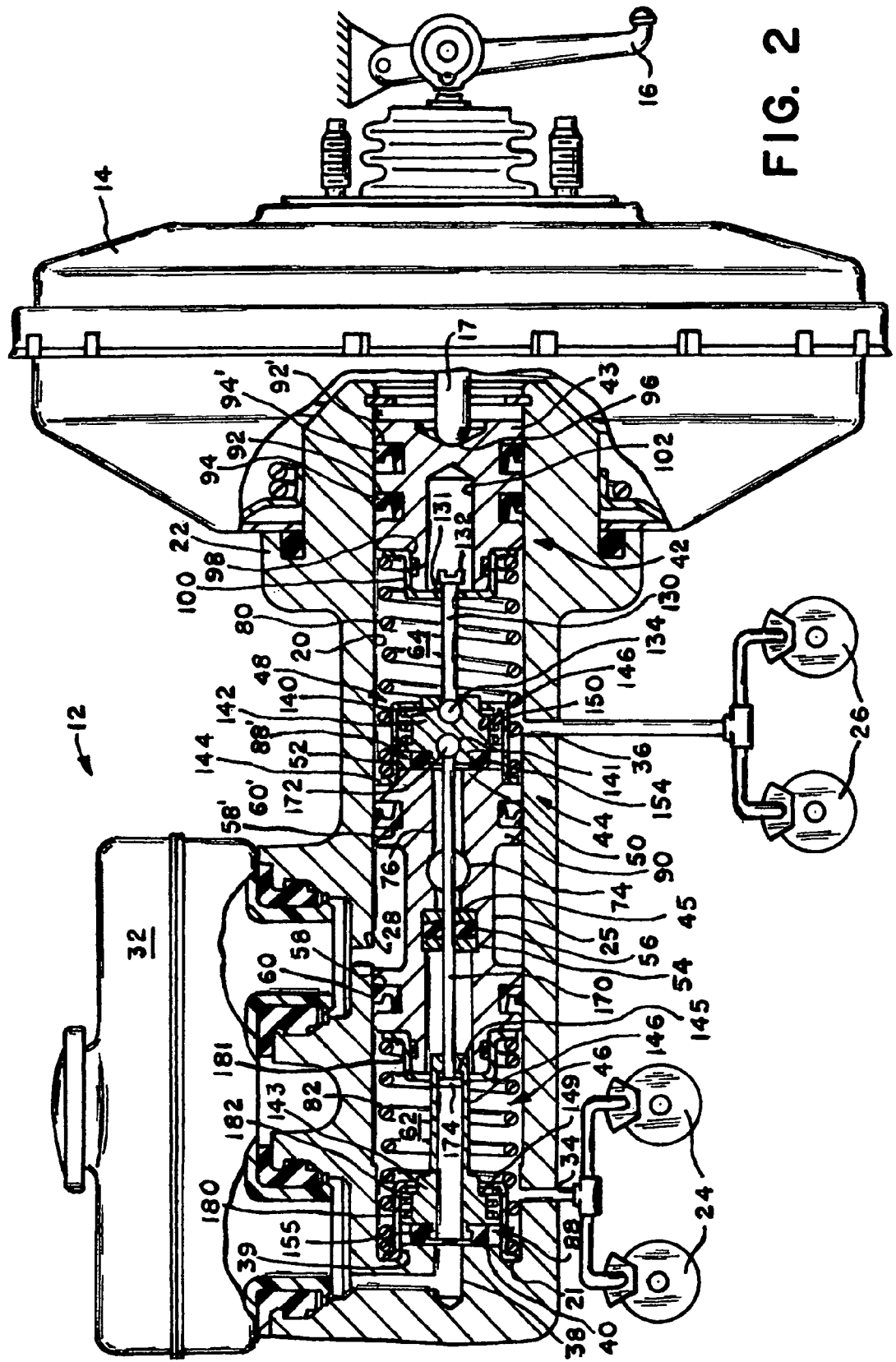
FIG. 2 is a sectional view of the master cylinder of FIG. 1 illustrating a relationship between the components during a brake application.

Once a master cylinder 12 and booster 14 as illustrated in FIG. 1 are installed in a vehicle and air is removed from the brake systems, a brake application can be effected in the following manner. An input force is applied to a brake pedal by an operator to activate the brake booster 14 and create an actuation force that is communicated through push rod 17 to pressurize fluid in the master cylinder 12. The actuation force acts on piston 42 to simultaneously move pistons 42 and 44 and compress return springs 80,82 and allow actuation springs 150,182 to respectively move cylindrical bodies 142, 143 such that the faces of caps 154,155 are moved into engagement with faces or seats 52,40 to simultaneously seal chambers 64 and 62. With ports 38 and 50 sealed further movement of pistons 44,42 will pressurize fluid in front chamber 62 and rear chamber 64 and this pressurized fluid is communicated through ports 34 and 36 to effect a corresponding brake application as illustrated in FIG. 2.

In more particular detail, when the rear chamber 64 and front chamber 62 are sealed, the input force acting on piston 42 moves the first 42 and second 44 pistons such that cylindrical body 142 moves within retainer 144 by actuation spring 150 and at the same time shaft 170 moves with the cylindrical body 142 to allow head 174 to move away from shoulder 145 and actuation spring 182 to move cylindrical body 143. The movement of caps 154 on cylindrical body 142 and cap 155 on cylindrical body 143 into engagement with corresponding seats 52 and 40 allow for the pressurization of fluid in the front chamber 62 and rear chamber 64 to essentially occur on initial movement of piston 42. As the fluid pressure in chambers 62 and 64 increases, a pressure differential is created across the poppets 88,88' to assist in preventing pressurized fluid from being communicated to reservoir 32 by was of bore 76 and port 38. The distance that piston 42 needs to move is defined by the distance from face on cap 154 and seat 52 and can be adjusted by the crimp or staking of the end of cylindrical body 142 that holds ball 134 or by placing a shim or washer 131 between head 132 and retainer 100. With this structure the communication of pressurized fluid to effect a brake application substantially corresponds with movement of the brake pedal 16 and is without a loss that may occur as a result of a need to sequentially close the compensation valves. This structure of this master cylinder 12 provides for maximum pressurization of fluid in the rear chamber 64 and front chamber 62 by allowing the heads 132. 174 on shafts 130,170 to respectively telescope into bore 102 and sleeve 146 to reduce an overall length of the housing 22 while functioning in a manner as described above.

When the brake application is completed, the operational force from the push rod 17 acting on the first piston 42 ceases and return springs 80, 82 expand to move the first 42 and second 44 pistons to the rest position shown in FIG. 1 with reservoir 32 connected to rear chamber 64 and front chamber 62 to allow any needed fluid to flow into bore 20 and maintain the fluid level in the brake system at capacity.

I claim:

1. A master cylinder (12) for use in a brake system having a housing (22) with a bore (20) therein, first (42) and second (44) pistons located in said bore (20) define a rear chamber (64) and a front chamber (62) with said rear chamber (64) being connected to a reservoir (32) by way of an axial bore (76) in said second piston (44) and a radial port (28) in said housing (22) and said front chamber (62) being connected to said reservoir (32) by an axial port (38) in said housing (22) to receive fluid and maintain a fluid level in said brake system at a desired level, characterized in that said first piston (42) is separated from said second piston (44) by a first return spring (80) to define the rear chamber (64) and said second piston (44) is separated from a bottom of the bore (20) by a second return spring (82) to define the front chamber (62); said first piston (42) being defined by a first cylindrical body (43) with a closed axial bore (102) that extends from a front end toward a rear end; said second piston (44) being defined by a second cylindrical body (90) with the axial bore (76) that extends from a seat (52) on a first end to a second end, a cross bore (74) that connects said axial bore with a radial groove (25) on the peripheral surface of cylindrical body (90), and a groove (54) in the axial bore (76) adjacent the cross bore (74); a first retainer (100) retained on said first cylindrical body (43) for receiving a first end of said return spring (80) while a second retainer (144) receives a second end of said return spring (80); a rear compensation valve (48) includes a third cylindrical body (142) that is held in said second retainer (144) has a first socket (140) on a rear end and a second socket (141) on a front end and a first shaft (130) with a head (134) on a first end that is located in said first socket (140) to cage said return spring (80) between said first retainer (100) and said second retainer (144) while compressing a first actuation spring (150); a third retainer (181) is located on said second cylindrical body (90) for receiving a first end of said second return spring (82) while a second end is located on a fourth retainer (180); a front compensation valve (46) includes a fourth cylindrical body (143) that is held in the fourth retainer (180); and a second (143) has a head (174) that is connected with an annular projection (146) that extends from said fourth cylindrical body (143) of the front compensation valve (46) and a second ball (172) that is retained in said second socket (141) in said third cylindrical body (142) to link the rear compensation valve (48) with the front compensation valve (46) and cage the second return spring (82) while compressing a second actuation spring (182), said fluid communication between said front chamber (62) and said rear chamber (64) and said reservoir (32) being controlled by movement of said first piston (42) in response to an input force as first actuation spring (150) closes said rear center port compensation valve (48) and said second actuation spring (182) closes said front center port compensation valve (46) to allow simultaneous pressurization of fluid in the front chamber (62) and rear chamber (64) that is supplied to the front wheel brakes (24) and rear (26) wheel brakes to effect a brake application.

2. The master cylinder (12) as recited in claim 1 further including a seal (56) that is held in said groove (54) and engages said second shaft (170) to allow movement of the shaft (170) while preventing communication from the chamber (62) to axial bore (76).

3. The master cylinder as recited in claim 1 further including adjusting means (131) to modify the length between said first retainer (100) and second retainer (144) and correspondingly the distance between the face on poppet (88') and seat (52).

4. The master cylinder as recited in claim 1 wherein said annular projection (146) engages and is guided by said fourth retainer (181) to assure that said poppet (88) is maintained in radial alignment with said seat (40).

5. The master cylinder as recited in claim 1 wherein said first socket (140) and second socket (141) respectively allow said first ball (134) and second ball (172) to rotate and as a result shaft (130) and shaft (170) are maintained in axial alignment with bore (20).

6. The master cylinder as recited in claim 1 wherein a pressure differential across said front poppet (88) and said rear poppet (88') assist in holding the front poppet (88) against seat (40) and the rear poppet (88') against seat (52) to prevent communication from the front chamber (62) and rear chamber (64) to reservoir (32).

7. The master cylinder as recited in claim 1 wherein a seal (56) is located on groove (54) to seal chamber (62) from axial bore (76) and to assist in holding shaft (170) in axial alignment within bore (20).

* * * * *